(12) United States Patent
Jeong et al.

(10) Patent No.: US 12,143,275 B2
(45) Date of Patent: Nov. 12, 2024

(54) METHODS AND NODES IN A COMMUNICATIONS NETWORK

(71) Applicant: Telefonaktiebolaget LM Ericsson (publ), Stockholm (SE)

(72) Inventors: Jaeseong Jeong, Solna (SE); Ursula Challita, Solna (SE); Pedro Batista, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 17/633,188

(22) PCT Filed: Aug. 6, 2019

(86) PCT No.: PCT/SE2019/050727
§ 371 (c)(1),
(2) Date: Feb. 5, 2022

(87) PCT Pub. No.: WO2021/025601
PCT Pub. Date: Feb. 11, 2021

(65) Prior Publication Data
US 2022/0271999 A1   Aug. 25, 2022

(51) Int. Cl.
| | |
|---|---|
| *H04L 41/16* | (2022.01) |
| *H04W 16/28* | (2009.01) |
| *H04W 24/02* | (2009.01) |
| *H04W 24/08* | (2009.01) |
| *H04W 28/18* | (2009.01) |

(52) U.S. Cl.
CPC ............. *H04L 41/16* (2013.01); *H04W 16/28* (2013.01); *H04W 24/02* (2013.01); *H04W 24/08* (2013.01); *H04W 28/18* (2013.01)

(58) Field of Classification Search
CPC ...... H04L 41/16; H04W 16/28; H04W 24/02; H04W 24/08; H04W 28/18
See application file for complete search history.

(56) References Cited

U.S. PATENT DOCUMENTS

| | | | |
|---|---|---|---|
| 9,189,730 B1 | 11/2015 | Coenen et al. | |
| 9,503,919 B2 | 11/2016 | Sofuoglu et al. | |
| 10,225,772 B2* | 3/2019 | Gemelos | H04W 36/008357 |
| 10,779,292 B2* | 9/2020 | Comsa | H04W 72/04 |
| 11,487,972 B2* | 11/2022 | Mase | G06F 18/217 |

(Continued)

FOREIGN PATENT DOCUMENTS

| | | |
|---|---|---|
| WO | 2016190789 A1 | 12/2016 |
| WO | WO 2018/184666 A1 | 10/2018 |

OTHER PUBLICATIONS

International Search Report and Written Opinion of the International Searching Authority, PCT/SE2019/050727, mailed May 15, 2020, 12 pages.

(Continued)

*Primary Examiner* — Chandrahas B Patel
(74) *Attorney, Agent, or Firm* — Sage Patent Group (57) ABSTRACT

A node in a communications network is configured to use a reinforcement learning agent to manage a process associated with the communications network. The node is further configured to adjust a value of an exploration rate associated with training of the reinforcement learning agent, based on a performance indicator associated with the managed process.

16 Claims, 6 Drawing Sheets

(56) References Cited

U.S. PATENT DOCUMENTS

| | | | |
|---|---|---|---|
| 11,514,347 B2* | 11/2022 | Dinh | H04L 41/0836 |
| 11,616,813 B2* | 3/2023 | Van Seijen | G06N 7/01 |
| | | | 726/1 |
| 2011/0106942 A1 | 5/2011 | Roskowski et al. | |
| 2012/0307662 A1 | 12/2012 | Puolakka et al. | |
| 2013/0208617 A1 | 8/2013 | Fukuta | |
| 2014/0044002 A1 | 2/2014 | Fujishiro | |
| 2016/0165462 A1 | 6/2016 | Tan et al. | |
| 2018/0206136 A1 | 7/2018 | Chow et al. | |
| 2019/0124667 A1 | 4/2019 | Comsa et al. | |
| 2019/0138948 A1 | 5/2019 | Janulewicz et al. | |
| 2019/0230046 A1 | 7/2019 | Djukic et al. | |
| 2019/0239238 A1 | 8/2019 | Calabrese et al. | |

OTHER PUBLICATIONS

Boutaba, Raouf et al., "A comprehensive survey on machine learning for networking: evolution, applications and research opportunities," Journal of Internet Services and Applications, vol. 9, No. 16, 2018, 99 pages.

ETSI TR 126 957 v15.0.0 (Jul. 2018), Universal Mobile Telecommunications System (UMTS); LTE; Study on Server and Network-assisted Dynamic Adaptive Streaming over HTTP (DASH) (SAND) for 3GPP multimedia services (3GPP TR 26.957 v15.0.0 Release 15), 54 pages.

European Search Report mailed Jul. 22, 2022 for European Patent Application No. 19940549.9, 4 pages.

Liang, Xuedong et al.; "A Multi-Agent Reinforcement Learning Based Routing Protocol for Wireless Sensor Networks"; IEEE International Symposium on Wireless Communication Systems; Piscataway, NJ; Oct. 21, 2008; 6 pages.

Calabrese, Francesco D. et al.; "Learning Radio Resource Management in 5G Networks: Framework, Opportunities and Challenges"; Cornell University Library; www.arxiv.org; Nov. 30, 2016; 17 pages.

Oh et al.; "Energy Savings through Dynamic Base Station Switching in Cellular Wireless Access Networks"; 2010 IEEE Global Telecommunications Conference GLOBECOM 2010; 5 pages.

Orsolic et al.; "YouTube QoE Estimation Based on the Analysis of Encrypted Network Traffic Using Machine Learning"; 2016 IEEE Globecom Workshops (GC Wkshps); 6 pages.

International Search Report and Written Opinion mailed Jul. 21, 2020 for PCT Application No. PCT/SE2020/050251; 12 pages.

European Search Report mailed Aug. 17, 2022 for European Patent Application No. 20819891.5, 4 pages.

* cited by examiner

METHODS AND NODES IN A COMMUNICATIONS NETWORK

CROSS REFERENCE TO RELATED APPLICATIONS

This application is a 35 U.S.C. § 371 national stage application of PCT International Application No. PCT/SE2019/050727 filed on Aug. 6, 2019, the disclosure and content of which is incorporated by reference herein in

TECHNICAL FIELD

This disclosure relates to methods, nodes and systems in a communications network. More particularly but non-exclusively, the disclosure relates to the use of reinforcement agents to manage processes associated with a communications network.

BACKGROUND

Reinforcement learning (RL) is a type of unsupervised machine learning process in which RL agents learn by autonomously interacting with an environment. The RL agent tries different (initially random) actions which alter the "state" of the environment. The RL agent receives feedback in the form of a reward for each action performed, the value of which is dependent on whether the state was improved or not by the action performed by the agent. Effectively the agent learns through interactive iteration with the environment in which (state, action, reward, next state) pairs are collected. In order to properly train the agent, the agent needs to try a number of random actions to explore how different actions affect the environment and in order to discover "good" actions. This is called "exploration" in reinforcement learning. The RL agent also repeats previous actions that have previously generated a positive reward (i.e. that were good for the system). This is called "exploitation" in reinforcement learning. A popular exploration method in RL is epsilon-greedy exploration whereby the agent tries a random action (i.e., exploration) with the probability epsilon, ϵ, and takes the learned action (i.e., exploitation) with the probability 1-epsilon.

There are various advantages to using RL agents to manage processes in communications networks (e.g. such as Radio Access Networks RANs). For example, RL agents are able to react quickly to ongoing changes in the network and able to determine/learn appropriate courses of action in highly complex systems.

However training methods such as epsilon greedy training, as described above, may be prohibitive in communications networks, as the aforementioned explorations with random actions (even if they are performed with small epsilon probability) may result in significant degradation in service quality. It is thus an object of the embodiments herein to improve upon RL training methods in communications networks.

SUMMARY

As described briefly above, reinforcement learning RL agents may be applied to a range of applications in communications networks (e.g., such as beamforming and traffic steering) where an agent can learn an optimal action whilst also evolving and updating itself autonomously in response to network changes. However, the exploration phase of the reinforcement learning scheme can be very costly and may result in performance degradation for end users. For instance, in epsilon-greedy exploration, the agent typically explores the action space at random instances of time. Thus, although it may be desirable to use reinforcement learning agents to control or manage processes in a communications network, in reality, when the reinforcement learning agent performs exploratory actions (e.g. performs a random action), this may degrade the user experience.

One way to solve this problem is to pre-train the RL agent before deployment. However, even with a pre-trained agent, the agent needs to keep exploring the environment (in what is known as online learning) otherwise the agent may not be as efficient as it could be. Furthermore, by preventing the RL agent from performing online learning, the agent is prevented from independently adapting to changes in the communications network.

Another solution may be to use a rule-based training scheme, whereby the RL agent is allowed to explore, for example, at certain times of the day, e.g. at night to minimize disruption. However such rule based schemes may also limit the RL agent as the RL agent ideally needs to be trained during representative (e.g. a wide range of) network conditions if it is to perform optimally.

A further solution may be to set the exploration rate to a low level such that the RL agent performs random actions at low frequency (but is still able to learn), however a low exploration probability value can result in slow convergence or convergence to a local optimum.

It is therefore valuable to investigate ways in which a RL can better explore the action space and thus learn optimal actions for different network conditions while, at the same time guaranteeing a service level agreement (SLA). In summary, it is therefore an object of some of the embodiments described herein to provide methods and systems that facilitate the use of reinforcement learning exploration in communications networks without degrading user-perceived service quality (e.g. without SLA compromise).

Therefore according to a first aspect, there is a node in a communications network. The node is configured to use a reinforcement learning agent to manage a process associated with the communications network. The node is further configured to adjust a value of an exploration rate associated with training of the reinforcement learning agent, based on a performance indicator associated with the managed process.

In this way, the disclosure herein proposes an application-oriented exploration technique (e.g. one that explores based on constraints of the underlying processes that the RL agent performs actions on) as opposed to a rule-based exploration (e.g. opposed to setting rules for exploration such as "only explore at night"). Adjusting the exploration rate based on performance as measured by a performance indicator in this way has the technical effect of minimising disruption in quality of service to users as a result of the RL exploration, whilst ensuring that the RL agent can still explore on the live system. In this way a better trained RL agent can also be produced, resulting in better management of the process managed by the RL agent and ultimately higher quality processes for network users.

According to a second aspect there is a node in a communications network. The node is configured to obtain a performance indicator associated with a process in the communications network, determine a value of an exploration rate associated with training of a reinforcement learning agent, based on the performance indicator, and send the determined value of the exploration rate to another node in the communications network for use by the other node to adjust the value of the exploration rate for the reinforcement learning agent.

According to a third aspect there is a method performed by a node in a communications network. The method comprises using a reinforcement learning agent to manage a process associated with the communications network. The method further comprises adjusting a value of an exploration rate associated with training of the reinforcement learning agent, based on a performance indicator associated with the managed process.

According to a fourth aspect there is a method performed by a node in a communications network. The method comprises obtaining a performance indicator associated with a process in the communications network, determining a value of an exploration rate associated with training of a reinforcement learning agent, based on the performance indicator, and sending the determined value of the exploration rate to another node in the communications network for use by the other node to adjust the value of the exploration rate for the reinforcement learning agent.

According to a fifth aspect there is a system in a communications network. The system is configured to use a reinforcement learning agent to manage a process associated with the communications network, and adjust a value of an exploration rate associated with training of the reinforcement learning agent, based on a performance indicator associated with the managed process.

According to a sixth aspect, there is a computer program product comprising a computer readable medium, the computer readable medium having computer readable code embodied therein, the computer readable code being configured such that, on execution by a suitable computer or processor, the computer or processor is caused to perform the method of the third or fourth aspects.

There are thus provided methods and nodes that i) facilitate exploration without detrimentally impacting upon user QoE, ii) allow online updating/training of the RL agent thus enabling the RL agent to adapt to any network changes iii) provide an application-oriented exploration technique as opposed to a rule-based exploration method; and iv) allow for the identification of network opportunities during which the network can explore actions while guaranteeing the service level agreement (SLA) to the end user.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

As described above, it is desirable to be able to use Reinforcement Learning (RL) agents to manage processes in communications networks due to the ability of RL agents to adapt to complex and changeable systems in an efficient and timely manner. However in order to obtain these advantages, RL agents must perform ongoing training or exploration whereby periodically, the RL agent performs "a random action" in order to determine or learn whether such an action may have a positive effect. As such exploration may have adverse effects on the network, for example, degrading user experience and quality of service. Embodiments herein aim to facilitate good training and exploration of an RL agent in a communications network without degrading user perceived quality of service.

Figure 1:
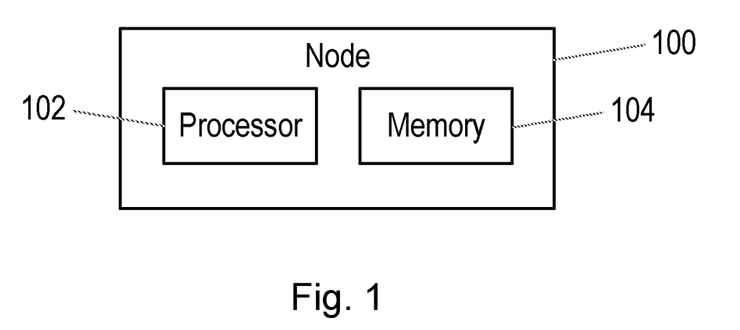
FIG. 1 shows an example node according to some embodiments herein.

FIG. 1 shows a node 100 in a communications network according to some embodiments herein. Briefly, the node 100 is configured (e.g. adapted or programmed) to use a reinforcement learning agent to manage a process associated with the communications network. Node 100 is further configured to adjust a value of an exploration rate associated with training of the reinforcement learning agent, based on a performance indicator associated with the managed process.

By determining or setting the value of the exploration rate according to a performance indicator, the RL agent may be allowed to perform exploration (e.g. try random actions) with a view to maintaining performance, for example based on times when the performance will not be adversely affected. This has at least three benefits: i) it facilitates a better trained RL agent, because the agent is able to perform exploration at a wider range of times and circumstances (e.g. not just at off peak times such as "at night" as may be stipulated in other rule-based training schemes) ii) training in view of a performance indicator may reduce degradation of quality of service to end users because training can be performed at times when the performance indicator indicates that exploration may be tolerated by the communications network and iii) a better trained RL agent trained in a wider range of network conditions may improve the RL agent, leading to better actions performed by the RL agent and improved quality of service from the application managed by the RL agent.

The skilled person will be familiar with reinforcement learning and reinforcement learning agents, however, briefly, reinforcement learning is a type of machine learning process whereby a reinforcement learning agent (e.g. algorithm) is used to perform actions on a system (such as a communications network) to adjust the system according to an objective (which may, for example, comprise moving the system towards an optimal or preferred state of the system). The reinforcement learning agent receives a reward based on whether the action changes the system in compliance with the objective (e.g. towards the preferred state), or against the objective (e.g. further away from the preferred state). The reinforcement learning agent therefore adjusts parameters in the system with the goal of maximising the rewards received.

Put more formally, a reinforcement learning agent receives an observation from the environment in state S and selects an action to maximize the expected future reward r. Based on the expected future rewards, a value function V for each state can be calculated and an optimal policy $\pi$ that maximizes the long term value function can be derived. In the context of this disclosure, the communications network is the "environment" in the state S. The "observations" are values relating to the process associated with the communications network that is being managed by the reinforcement learning agent and the "actions" performed by the reinforcement learning agents are the adjustments made by the reinforcement learning agent that affect the process that is managed by the reinforcement learning agent. Generally, the reinforcement learning agents herein receive feedback in the form of a reward or credit assignment every time they perform an adjustment (e.g. action). As noted above, the goal of the reinforcement learning agents herein is to maximise the reward received.

Examples of algorithms or schemes that may be performed by the RL agent described herein include, but are not limited to, Q learning, deep Q Network (DQN), and state-action-reward-state-action (SARSA). The skilled person will appreciate that these are only examples however and that the teachings herein may be applied to any reinforcement learning scheme whereby random actions are explored.

When a RL agent is deployed, the RL agent performs a mixture of "random" actions that explore an action space and known or previously tried actions that exploit knowledge gained by the RL agent thus far. Performing random actions is generally referred to as "exploration" whereas performing known actions (e.g. actions that have already been tried that have a more predictable result) is generally referred to as "exploitation" as previously learned actions are exploited.

In some embodiments herein, whether the RL agent performs exploration or exploitation is determined according to an epsilon-greedy scheme whereby the agent tries a random action (i.e., exploration) with the probability "epsilon", $\varepsilon$, and performs a previously learned action (i.e., exploitation) with the probability 1-epsilon (i.e. 1-$\varepsilon$). The parameter epsilon is an example of an exploration rate as described herein.

There are various advantages and disadvantages to setting epsilon at different levels when the RL agent is deployed in a communications network. Generally, if epsilon is set to a high value (e.g. for example set to be greater than, for example, 0.8) then you get faster convergence for optimal action decision. However, a high epsilon results in a high frequency of random actions which could result in performance degradation to the users during the exploration phase. For instance, this may possibly result in congestion. Conversely, if epsilon is set to a low value (e.g. less than, for example 0.2) then in any given time period, fewer random exploration actions are performed and thus there is less chance that the RL may cause Quality of Experience (QoE) degradation, however there is less exploration which may result in the RL agent converging on a local optima and performing in a sub-standard manner (e.g. network sub utilization and/or low QoE in the long run). A lower epsilon also results in slower convergence speeds.

It is noted at this point that training of a reinforcement agent may be an ongoing process, so that the RL agent can update and evolve with changing conditions in the communications network. As such, the RL agent is trained as it is used and references to "using" or "training" a RL agent may be considered interchangeable herein, unless it is explicitly stated otherwise.

The skilled person will appreciate that the details provided above are merely examples and that the teachings herein may be applied equally to other RL agents and training schemes.

Turning back to FIG. 1, generally, the communications network (or telecommunications network) may comprise any one, or any combination of: a wired link (e.g. ASDL) or a wireless link such as Global System for Mobile Communications (GSM), Wideband Code Division Multiple Access (WCDMA), Long Term Evolution (LTE), WiFi, or Bluetooth wireless technologies. The skilled person will appreciate that these are merely examples and that the communications network may comprise other types of links.

Generally, the node 100 may comprise any component or network function (e.g. any hardware or software module) in the communications network suitable for managing a process in the communications network. For example, a node may comprise equipment capable, configured, arranged and/or operable to communicate directly or indirectly with a device (such as a wireless device of user equipment) and/or with other network nodes or equipment in the communications network to enable and/or provide wireless or wired access to the device and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include, but are not limited to, core network functions such as, for example, core network functions in a Fifth Generation Core network (5GC), such as an Access and Mobility Management function (AMF), a Session Management function (SMF) or a Network Slice Selection Function (NSSF).

The node 100 may be configured or operative to perform the methods and functions described herein, such as the method 400 described below. The node 100 may comprise processing circuitry (or logic) 102. It will be appreciated that the node 100 may comprise one or more virtual machines running different software and/or processes. The node 100 may therefore comprise one or more servers, switches and/or storage devices and/or may comprise cloud computing infrastructure or infrastructure configured to perform in a distributed manner, that runs the software and/or processes.

The processing circuitry 102 may control the operation of the node 100 in the manner described herein. The processing circuitry 102 can comprise one or more processors, processing units, multi-core processors or modules that are configured or programmed to control the node 100 in the manner described herein. In particular implementations, the processing circuitry 102 can comprise a plurality of software and/or hardware modules that are each configured to perform, or are for performing, individual or multiple steps of the functionality of the node 100 as described herein.

The node 100 may comprise a memory 104. In some embodiments, the memory 104 of the node 100 can be configured to store program code or instructions that can be executed by the processing circuitry 102 of the node 100 to perform the functionality described herein. Alternatively or in addition, the memory 104 of the node 100, can be configured to store any requests, resources, information, data, signals, or similar that are described herein. The processing circuitry 102 of the node 100 may be configured to control the memory 104 of the node 100 to store any requests, resources, information, data, signals, or similar that are described herein.

It will be appreciated that the node 100 may comprise other components in addition or alternatively to those indicated in FIG. 1. For example, in some embodiments, the node 100 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processing circuitry 102 of node 100 may be configured to control such a communications interface to transmit to and/or receive from other nodes or network functions requests, resources, information, data, signals, or similar.

As noted above, the node 100 is configured to use a reinforcement learning agent to manage a process (referred to herein as "the managed process") associated with the communications network. In some embodiments, the managed process may comprise a beamforming process, or a traffic steering process. For example, the reinforcement learning agent may determine the path through the communications network through which traffic is sent from one device or node to another device or node. In some embodiments, the managed process may comprise a process related to scheduling, or spectrum management.

In some embodiments, the managed process may comprise a process related to data streaming, e.g. streaming of video, audio or other live data. Generally, it will be appreciated that the teachings herein may be applied to any process that may be managed (e.g. influenced, or altered) by a reinforcement learning agent.

As indicated above, the node 100 is configured to adjust a value of an exploration rate (such as the exploration rate "epsilon" described above) based on a performance indicator associated with the managed process.

Generally, the performance indicator may comprise any indicator describing the performance of some aspect of, or conditions in, the communications network. Examples of performance indicators include, but are not limited to, a session-level status measure, an application-level status measure, a network status measure, a quality of experience measure or a quality of service measure.

The performance indicator may be associated with the managed process. For example, the performance indicator may be related to the process managed by the RL agent; the value of the performance indicator may be influenced by the process managed by the RL agent (managed process); or, an aspect of the process managed by the RL agent (managed process) may be influenced or determined by the value of the performance indicator. The skilled person will appreciate that these are examples only and that the performance indicator may be associated with the managed process in some other way.

In some embodiments, the performance indicator may be a performance indicator related in some way to, e.g. influenced by, the actions performed by the reinforcement learning agent or the process managed by the reinforcement learning agent (i.e. the "managed process").

The performance indicator may describe, for example, a quality of a call across the communications network, the quality of an audio or video streaming experience (e.g. if the audio or video stops or buffers), or the responsiveness of an internet application such as a gaming application or other internet based app. In embodiments where the managed process relates to data streaming, the performance indicator may comprise, for example, a measure of a download deadline in a delay tolerant downloading application.

In some embodiments, the node 100 may be configured to determine or calculate the performance indicator itself. In other embodiments, the node 100 may be configured to obtain (e.g. receive) the performance indicator from another node in the network. In some embodiments, the node 100 may be configured to obtain the performance indicator and/or a value for the exploration rate from a network orchestrator in the communications network.

In one example embodiment, the managed process comprises radio beam selection (e.g. a reinforcement learning agent controls radio beam selection) in a communications network. In this embodiment, the performance indicator used for adjusting the exploration rate may be obtained from an application running on top of the communication network, such as a file downloader application. The performance indicator may comprise, for example, a download rate.

It is noted at this point, that the Radio Resource Management (RRM) control time scale is usually much shorter than the session level long-term performance timescale which is the timescale that most affects user-perceived quality of experience (QoE). In other words, QoE is perceived as a consequence of multiple RRM timeframes, thus a few bad RRM timeframes do not necessarily translate to bad QoE, because in the same session there might be multiple good RRM timeframes.

Therefore, in some embodiments herein, the RL agent may control or take actions on a RRM timeframe with epsilon-greedy exploration. And thus adjustments to the epsilon value may affect the session/application-level QoE status and performance.

In some embodiments, being configured to adjust the value of the exploration rate based on a performance indicator associated with the managed process may comprise, for example, the node being configured to adjust the value of the exploration rate so as to maintain a performance of the managed process above a predetermined level. For example, the node 100 may be configured to monitor the performance indicator and the effect that the actions performed by the reinforcement learning agent have on the performance indicator. The node 100 may thus adjust the value of the exploration rate in an iterative manner by, for example, increasing the value of epsilon when the performance indicator indicates that the performance is above the predetermined level and/or lowering epsilon when the performance is lower than the predetermined level. In this way, epsilon may be tuned so as to enable the RL agent to explore as much as possible whilst preserving a particular performance level.

In some embodiments, the node 100 may be configured to increase the value of the exploration rate with increasing performance of the managed process. In such a scenario, the session/application-level performance may already be high enough so that using a few (or a higher proportion of) RRM timeframes for exploration does not significantly impact the high performance.

Put another way, the node 100 may be configured to adjust the value of epsilon such that epsilon is high when the performance of the managed process is high.

In some embodiments, the node 100 may be configured to increase the value of the exploration rate with decreasing performance of the managed process. In such a scenario, the session/application-level performance may already be low enough so that using a few (or a higher proportion of) RRM timeframes for exploration does not matter, because the performance is already bad.

Put another way, the node may be configured to adjust the value of epsilon such that epsilon is high when the performance of the managed process is low.

To summarise, in some embodiments herein, a RL agent is allowed to perform a more aggressive exploration strategy when either the performance is already so high that it can withstand a few random actions being performed by the agent without incurring unacceptable performance degradation, or conversely if the performance is already so bad that a few random actions do not make so much of a difference.

In some embodiments, the node may be configured to increase the value of the exploration rate when the managed process is fault tolerant. The skilled person will be familiar with fault tolerance, whereby for example, there are built in back-up mechanisms for a process. Examples include, but are not limited to, a device receiving service from two or more nodes such that the second node may compensate if the service on the first node reduces in quality (e.g. due to RL agent exploration).

In the manner above, epsilon may be increased (e.g. more exploration may be performed) during normal working conditions allowing better training of the RL agent without impacting the QoS experienced by the user. The better training further increases the performance of the RL agent and thus the communications network as a whole.

Turning now to other embodiments, the node may be configured to adjust the value of epsilon such that epsilon is high when the performance of the managed process is low or high (to take advantage of both regimes described above) and adjust the value of epsilon such that epsilon is low when the performance is intermediate (and thus a higher proportion of random actions would be likely to negatively impact on the service quality).

In more detail, in some embodiments, the node may be configured to increase the value of the exploration rate when a performance as indicated by the performance indicator increases above a first threshold. The first threshold may be, for example, a threshold indicative of good or high performance and may be set in a configuration phase by a user dependent on the particular communications network, the network conditions and/or SLA requirements.

In some embodiments, the node may be configured to adjust the value of the exploration rate such that the reinforcement learning agent undertakes a more aggressive exploration strategy when the performance as indicated by the performance indicator increases above the first threshold. For example, the exploration rate may be set such that epsilon is high when the performance as indicated by the performance indicator increases above the first threshold. For example, in embodiments where the RL agent employs an epsilon greedy strategy, the exploration rate (e.g. epsilon) may be set to a value greater than about 0.7, a value greater than about 0.8, a value greater than about 0.9 or a value greater than about 0.95.

In some embodiments, the node may be configured to increase the value of the exploration rate when the performance as indicated by the performance indicator decreases below a second threshold, the second threshold being lower than the first threshold. The second threshold may be indicative, for example of poor or low performance and may be set in a configuration phase by a user dependent on the particular communications network, network conditions and/or SLA requirements.

In some embodiments, the node may be configured to adjust the value of the exploration rate such that the reinforcement learning agent undertakes a more aggressive exploration strategy when the performance as indicated by the performance indicator decreases below the second threshold. For example, the exploration rate may be set such that epsilon is high when the performance as indicated by the performance indicator decreases below the second threshold. For example, in embodiments where the RL agent employs an epsilon greedy strategy, the exploration rate (e.g. epsilon) may be set to a value greater than about 0.7, a value greater than about 0.8, a value greater than about 0.9 or a value greater than about 0.95.

In some embodiments, the node may be configured to decrease the value of the exploration rate when the performance as indicated by the performance indicator is between the first and second thresholds. The first and second thresholds may be set such that the performance is considered acceptable when the performance is between the first and second thresholds.

Put another way, the node may be configured to adjust the value of the exploration rate such that the reinforcement learning agent takes a (more) conservative exploration strategy (or a primarily exploitative strategy) when the performance as indicated by the performance indicator is between the first and second thresholds. For example, the exploration rate may be set such that epsilon is low when the performance as indicated by the performance indicator is between the first and second thresholds. For example, in embodiments where the RL agent employs an epsilon greedy strategy, the exploration rate (e.g. epsilon) may be set to a value less than about 0.3, a value less than about 0.2, a value less than about 0.1 or a value less than about 0.05.

In some embodiments, the node is configured to adjust the value of the exploration rate such that the reinforcement learning agent undertakes a more aggressive exploration strategy when the performance indicator indicates that the process managed by the reinforcement learning agent is fault tolerant. For example, in embodiments where the managed process is fault tolerant and where the RL agent employs an epsilon greedy strategy, the exploration rate (e.g. epsilon) may be set, for example, to a value greater than about 0.7, a value greater than about 0.8, a value greater than about 0.9 or a value greater than about 0.95.

It will be appreciated by the skilled person, that when using an epsilon greedy strategy, unless epsilon is set to 0 (only exploit) or 1 (only explore), that a mixture of exploring and exploiting will occur at any given time with a probability of epsilon and 1-epsilon respectively (as described above).

It will be appreciated that the embodiments above may be combined in different ways. For example, in one embodiment, the node is configured to use a reinforcement learning agent to manage a process associated with the communications network, and adjust a value of an exploration rate associated with training of the reinforcement learning agent, based on a performance indicator associated with the managed process. In this embodiment, the node is configured to increase the value of the exploration rate when a performance as indicated by the performance indicator increases above a first threshold; increase the value of the exploration rate when the performance as indicated by the performance indicator decreases below a second threshold, the second threshold being lower than the first threshold; and decrease the value of the exploration rate when the performance as indicated by the performance indicator is between the first and second thresholds.

Thus according to the embodiments above, an RL agent (e.g., on a base station) can explore actions at the physical layer at network opportunities during which the application layer quality is not deteriorated thus being transparent to the end user and guaranteeing the promised SLA. As such, this invention enables an agent to explore in real network conditions in an adaptive manner ensuring better performance for cellular-connected users whilst the RL agent trains/explores. This disclosure improves the conventional reinforcement learning algorithm so that it can be adopted for different uses cases in wireless cellular networks while not degrading the performance of the users.

Figure 2:
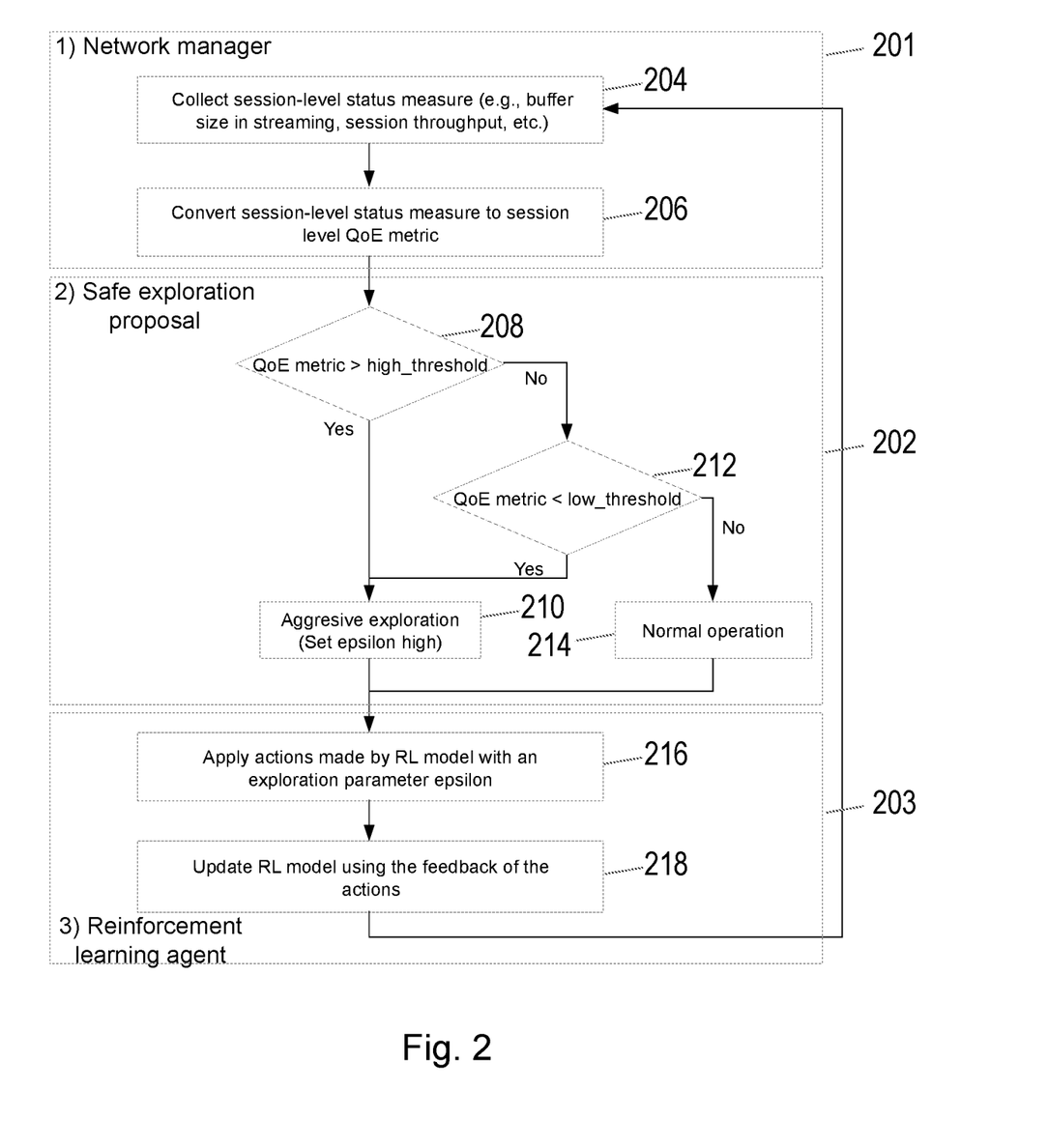
FIG. 2 shows an example method according to some embodiments herein.

FIG. 2 illustrates an example method according to some embodiments, which applies some of the principles described above. In this embodiment there is a network manager 201, an exploration manager 202 and a RL agent 203 in a communications network (not shown in FIG. 2).

The network manager, 201, is an enabler and is responsible for exposing the status of the network, for this it can use a range of methods that will be familiar to the skilled person. The exploration manager, 202, may be a new block or embedded in existing hardware or software, dependent on the application. The RL agent 203 may comprise any of the types of RL agents described above.

In terms of locations in nodes, it will be appreciated that the functionality described in this embodiment may be implemented in a many configurations. For example, the network manager, 201, may be centralised in the network (e.g. it may be in the core), whilst the agent, 203, may be comprised in an eNodeB/gNodeB scheduler. In such a scenario, the exploration manager, 202, may be located in closer proximity to the agent. The skilled person will appreciate however that this is merely an example, and that the functionality described below could be spread across other nodes, in different locations/configurations, or even be performed by a single node.

In a first block 204 in FIG. 2, network manager 202 collects data related to performance in the communications network, in this example the network manager collects one or more session-level status measures, for example a streaming buffer size, or a session throughput.

In a second block 206 the network manager converts the session level status measure to a session level Quality of Experience QoE metric. The QoE metric may reflect session-level performance which is defined according to the type of application (e.g., buffered video in video streaming, download deadline in delay tolerant downloading application, etc.). The network manager 201 passes the QoE measure to the exploration manager 202.

In a third block, 208, the exploration manager 202 compares the QoE metric to a first threshold ("high_threshold") which as noted above may correspond to what might be considered to be a good or high level of QoE. If the QoE metric is higher than the first threshold, then at block 210, a more aggressive exploration strategy is set (e.g. epsilon is increased or set to a high value).

If the QoE metric is lower than the first threshold, at a block 212, the QoE metric is then compared to a second threshold ("low_threshold") which as noted above may correspond to what might be a considered to be a poor or low QoE. If the QoE metric is lower than the second threshold then at block 210, a more aggressive exploration strategy is set (e.g. epsilon is increased or set to a high value).

If the QoE metric is higher than the second threshold (but lower than the first) then at block 214, an intermediate (or normal strategy) is employed whereby less aggressive exploration (e.g. more exploitation) is performed and epsilon is set to a lower level.

The determined value of epsilon is applied to actions performed by the RL agent in block 216 and the RL model is updated, based on feedback from the actions in block 218.

In summary, if the session-level QoE metric is either sufficiently good (greater than high_threshold as in flowchart) or extremely bad (lower than low threshold as in flowchart), the exploration parameter 'epsilon' is set to a high value which will push the RL model to output random actions more frequently for exploration. Otherwise, 'epsilon' is set to a low value, or a "default" setting, in which the RL model outputs the learned action more frequently in order to maintain the performance level.

Turning now to other embodiments, in some embodiments, the process that is managed by the reinforcement learning agent comprises data transmission of a data stream to a user device. For example, the data stream may comprise a video stream or an audio stream. The data stream may be associated with the streaming of television, music or gaming, for example.

In such an embodiment, the performance indicator may comprise a volume of buffered data on the user device. The exploration rate associated with training of the reinforcement learning agent may thus be adjusted based on the volume of buffered data. For example, the exploration rate may be increased whilst the volume of buffered data is sufficient to enable the data to be consumed by the user on the user device in a continuous manner.

In more detail, in video streaming for example (although the following may also be applied to other types of data streaming), the user device performs two processes, the first is downloading video segments and storing them in a buffer; and a second is consuming segments from the buffer and displaying them to the user. The average rate c from which segments are consumed from the buffer is fixed, as a function of the video itself; the average rate of insertion i into the buffer, on the other hand, is a function of (e.g. depends on) the network conditions. Thus, the best quality of experience (QoE) is achieved if the network can provide $i \geq c$, accordingly, increasing or maintaining the buffer level s (seconds). In good, and desirable, network conditions $i \gg c$ and the buffer fills up to its maximum size r (usually tenths of seconds).

Therefore, in some embodiments, if the buffer level $s \geq 0$, RL exploration may be increased (e.g. the exploration rate may be increased). In some embodiments, RL exploration may be increased for at least s seconds without QoE degradation. Put another way, the RL exploration may be increased for the duration of time that it will take for the application to consume the data in the buffer. This is because, even if the exploration disrupts transfer of subsequent data to the buffer, there is enough data in the buffer such that the user may consume the data stream without interruption for s seconds. In this example, QoE is assured if $i \geq c$ after the exploration period.

The RL agent may obtain the value s in various ways, for example, i) using an application assisted method, whereby there exists a communication channel between the RL and the video streaming application, and hence s can be directly obtained by the RL; or ii) a stand-alone method, whereby if there is no such communication, s may be estimated.

For the application assisted method, the Third Generation Partnership Project (3GPP) has been studying such a network application communication channel, an example being found in: "Study on Server and Network-assisted Dynamic Adaptive Streaming over HTTP (DASH) (SAND) for 3GPP multimedia services," 3GPP TR 26.957, March 2017.

For the stand-alone method, the perceived user QoE and buffer status may be estimated, for example using machine learning with techniques such as those found in the paper by Orsolic, D. Pevec, M. Suznjevic, and L. Skorin-Kapov entitled "YouTube QoE Estimation Based on the Analysis of Encrypted Network Traffic Using Machine Learning," 2016 IEEE Globecom Workshops (GC Wkshps), 2016, pp. 1-6.

With the use of emerging automated networks, such as the envisioned zero touch network management, there may be also be a communication channel to the network orchestrator. This may facilitate a third, network assisted method. In such a network assisted method, a network orchestrator, which has access to the full network status, may determine when the QoE/SLA for end-users is good or bad enough and send a signal to the RL agent (or the node on which the RL agent resides) to trigger an increase in the exploration rate.

For example, in the Open Network Automation Platform (ONAP), the Ericsson Adaptive Policy eXecution Engine (APEX) and CENX Service Assurance can detect bad network conditions. In some embodiments if the root cause of the problem is not the RL controlled system, then exploration is allowed (e.g. the value of the exploration rate may be increased). Similarly, as described above, the exploration rate may be increased in good network conditions using such a method.

In some embodiments there is also a fully stand-alone method whereby, for example, for some applications (e.g., delay tolerant large file transfer) it is safe to assume that if the Radio Link Control (RLC) buffer is not full, lower layers performance can be tolerated, as long as the buffer does not fill up and packages have to be dropped. Thus in one embodiment, the managed process may comprise delay tolerant file transfer (e.g. a reinforcement learning agent may manage or control processes related to delay tolerant file transfer). In this embodiment, the performance indicator associated with the managed process may comprise the status of an RLC buffer. The step of adjusting a value of an exploration rate associated with training of the reinforcement learning agent, based on the performance indicator associated with the managed process may comprise adjusting the value of the exploration rate so as to explore more aggressively (e.g. increasing epsilon) if the RLC buffer is not full. The step of adjusting may further comprise adjusting the value of the exploration rate so as to explore less aggressively (e.g. decreasing epsilon) if the RLC buffer is full.

Figure 3:
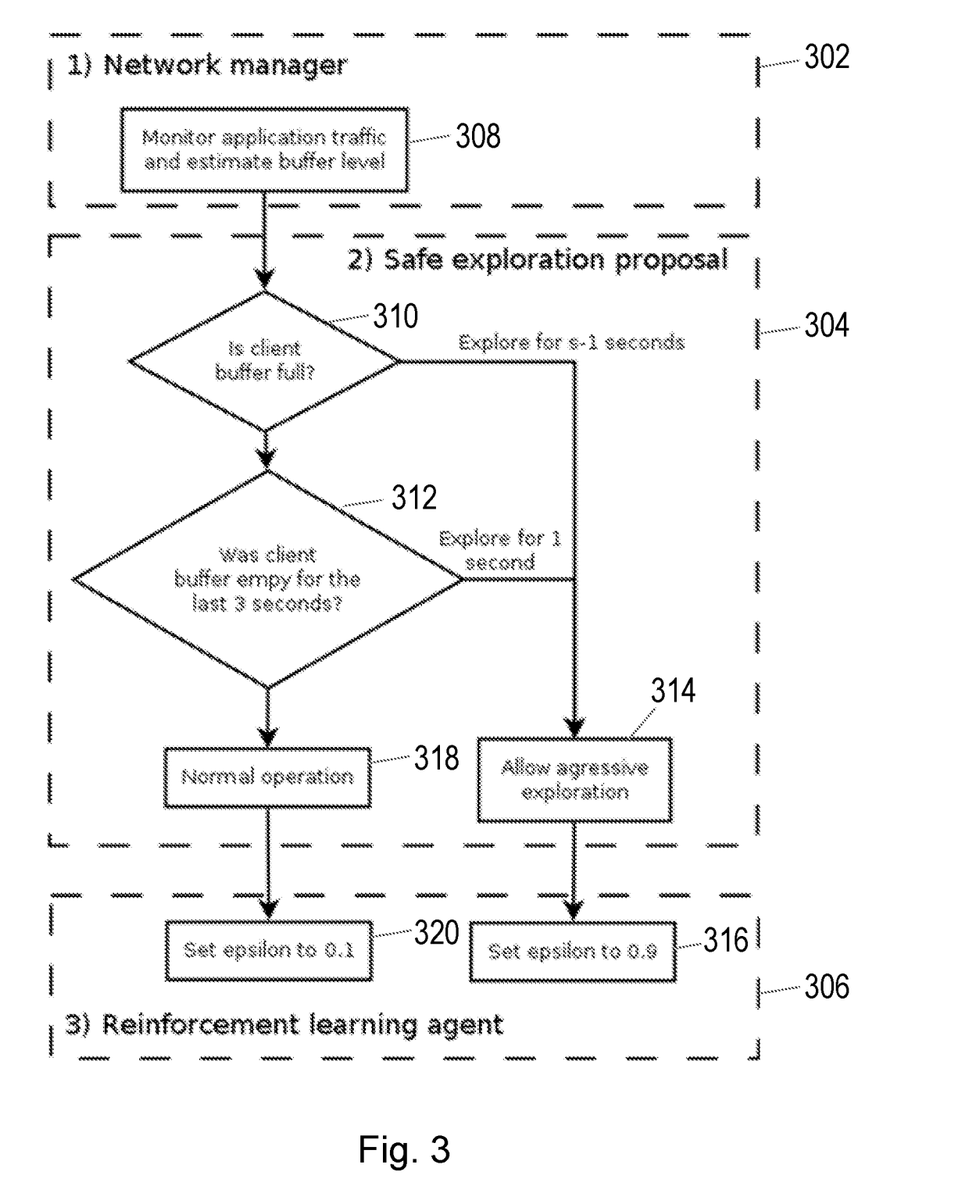
FIG. 3 shows an example method according to some embodiments herein.

Turning now to FIG. 3, FIG. 3 illustrates a more detailed example according to some embodiments herein relating to data transfer of video data to a user device. It will be appreciated that the details of this embodiment also apply equally to other data streaming applications. In this embodiment, the node uses the reinforcement learning agent to manage beam selection. For example, the managed process may comprise managing the beams of a radio base station (e.g. for example, actions taken by the reinforcement learning agent may include determining which user to associate with which beam and/or setting a power level associated with a beam).

FIG. 3 shows a simplified example whereby more aggressive exploration is allowed in the extreme cases of the buffer being either full (e.g. indicative of "good" QoE) or empty (e.g. indicative of "bad" QoE, whereby the service is already so bad a that exploration in an increased number of RMM timeframes does not make a significant difference to the QoE).

FIG. 3 shows (as in FIG. 2) a network manager 302, an exploration manager 304 and a RL agent 306. In a first block 308 the network manager 302 may monitor application traffic and estimate a buffer level. For example, the buffer level may be estimated from the application traffic using a machine learning method as described above.

In block 310, if the buffer is full (e.g. good QoE), then the method moves to block 314 whereby aggressive exploration is allowed for a predetermined period of time (e.g. such as 1 second). In block 316, the aggressive exploration is facilitated by increasing the exploration rate. As an example, by setting the exploration rate of the RL agent 306 to a value of 0.9. It will be appreciated that this is an example only and that the exploration rate could be set to any value that encourages a higher rate of exploration.

If in block 310 the buffer is determined not to be full, then in block 312, it is then determined whether the client buffer has been empty for 3 seconds or more (e.g. poor QoE detected). If the client buffer has been empty for 3 seconds or more then aggressive exploration is allowed in block 314 for a predetermined period of time (e.g. such as 1 second). It will be appreciated that 3 seconds is an example only and that in block 312, the threshold for which the client buffer is empty may be set at any predetermined number of seconds, x.

In block 316, the aggressive exploration is facilitated by increasing the exploration rate. As an example, by setting the exploration rate of the RL agent 306 to a value 0.9. It will be appreciated that this is an example only and that the exploration rate could be set to any value that encourages a higher rate of exploration.

If at block 312 the client buffer has not been empty for more than 3 seconds (intermediate QoE) then the method moves to block 318 whereby a more conservative exploration strategy is employed (e.g. higher probability of exploitation). At block 320 the exploration rate may be decreased, or set to a low value. For example, the exploration rate (epsilon) may be set to 0.1. It will be appreciated that this is an example only and that the exploration rate could be set to any value that encourages a higher rate of exploitation.

In this way, exploration is permitted whilst the buffer is either full indicating good service or empty for a period of time indicating already bad service, such that in either regime, exploration by the RL agent does not severely impact the service received by the user.

Figure 4:
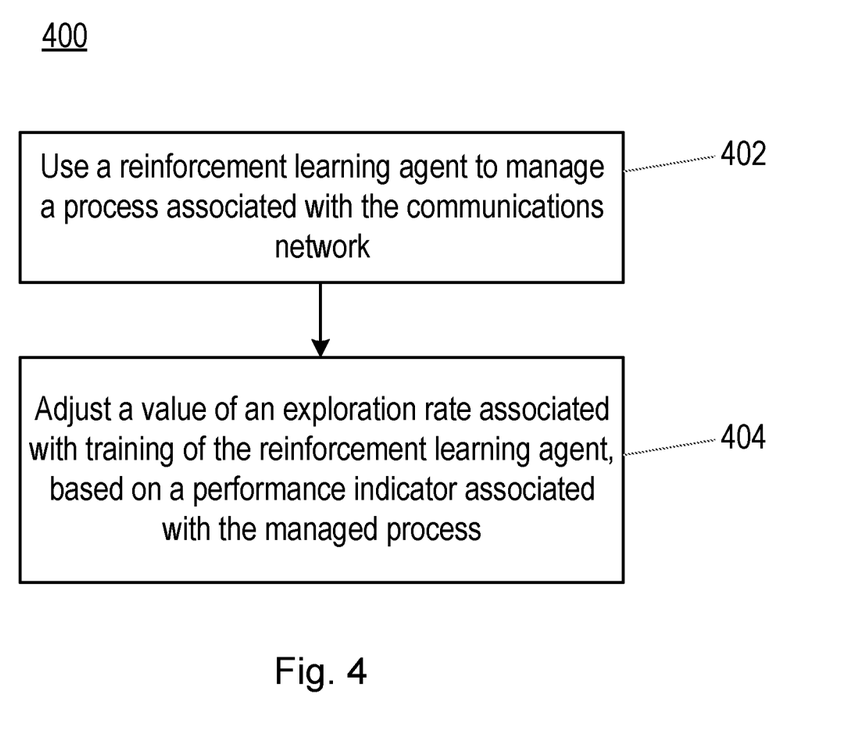
FIG. 4 shows an example method according to some embodiments herein.

Turning now to FIG. 4, there is a method 400 performed by a node in a communications network. Briefly, the method 400 comprises in a first block 402 using a reinforcement learning agent to manage a process associated with the communications network. In a second block 404 the method comprises adjusting a value of an exploration rate associated with training of the reinforcement learning agent, based on a performance indicator associated with the managed process.

Using a reinforcement learning agent to manage a process associated with the communications network and adjusting a value of an exploration rate associated with training of the reinforcement learning agent were discussed above with respect to the functionality of the node 100 and FIGS. 1 to 3 and the details therein will be understood to apply equally to the method 400.

Figure 5:
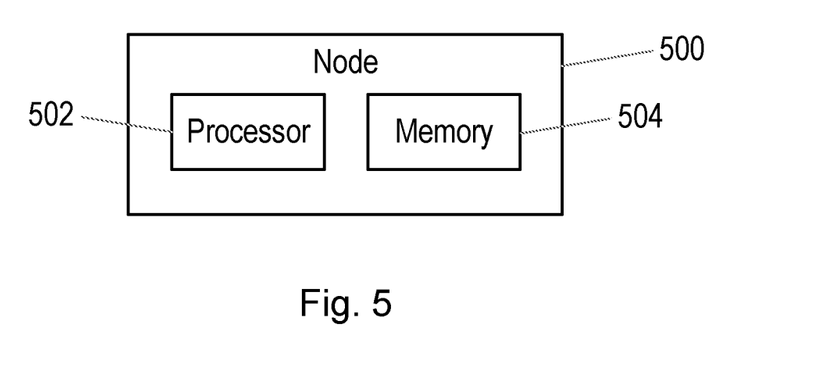
FIG. 5 shows an example node according to some embodiments herein.

Turning now to FIG. 5, in some embodiments there is a node 500 in a communications network. Generally, the node 500 may comprise any of the node types discussed above with respect to the node 100. In particular, in some embodiments the node 500 may comprise a network orchestrator (or comprise a node that has the functionality of a network orchestrator).

The node 500 may be configured or operative to perform the methods and function described herein, such as the method 600 described below. The node 500 may comprise processing circuitry (or logic) 502. It will be appreciated that the node 500 may comprise one or more virtual machines running different software and/or processes. The node 500 may therefore comprise one or more servers, switches and/or storage devices and/or may comprise cloud computing infrastructure or infrastructure configured to perform in a distributed manner, that runs the software and/or processes.

The processing circuitry 502 may control the operation of the node 500 in the manner described herein. The processing circuitry 502 can comprise one or more processors, processing units, multi-core processors or modules that are configured or programmed to control the node 500 in the manner described herein. In particular implementations, the processing circuitry 502 can comprise a plurality of software and/or hardware modules that are each configured to perform, or are for performing, individual or multiple steps of the functionality of the node 500 as described herein.

The node 500 may comprise a memory 504. In some embodiments, the memory 504 of the node 500 can be configured to store program code or instructions that can be executed by the processing circuitry 502 of the node 500 to perform the functionality described herein. Alternatively or in addition, the memory 504 of the node 500, can be configured to store any requests, resources, information, data, signals, or similar that are described herein. The processing circuitry 502 of the node 500 may be configured to control the memory 504 of the node 500 to store any requests, resources, information, data, signals, or similar that are described herein.

It will be appreciated that the node 500 may comprise other components in addition or alternatively to those indicated in FIG. 5. For example, in some embodiments, the node 500 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processing circuitry 502 of node 500 may be configured to control such a communications interface to transmit to and/or receive from other nodes or network functions requests, resources, information, data, signals, or similar.

Briefly, the node 500 may be configured to obtain a performance indicator associated with a process in the communications network, determine a value of an exploration rate associated with training of a reinforcement learning agent, based on the performance indicator, and send the determined value of the exploration rate to another node in the communications network for use by the other node to adjust the value of the exploration rate for the reinforcement learning agent.

In this way, a network assisted method may be performed as briefly described above. In such a network assisted method, the node 500 may comprise a network orchestrator. The network orchestrator may have access to the full network status, and may determine when the QoE/SLA for end-users is, for example, good or bad enough or fault tolerant and send a signal to the RL agent (or the node on which the RL agent resides) to trigger an increase in the exploration rate.

The performance indicator may be obtained (e.g. requested and/or received) by the node 500 from another node in the communications network. Or determined directly by the node 500. For example, in some embodiments, the node 500 may collect session level status measure (s) such as a buffer size or session throughput and convert these into a performance indicator. In some embodiments, the performance indicator relates to network-level performance.

Determining a value of an exploration rate associated with training of a reinforcement learning agent, based on the performance indicator was discussed above with respect to how the node 100 determines how to adjust the value of the exploration rate associated with training of the reinforcement learning agent and the details therein will be understood to apply equally to the configuration of the node 500.

In this way, a node 500 may determine appropriate values of an exploration rate that maintain network level performance.

Figure 6:
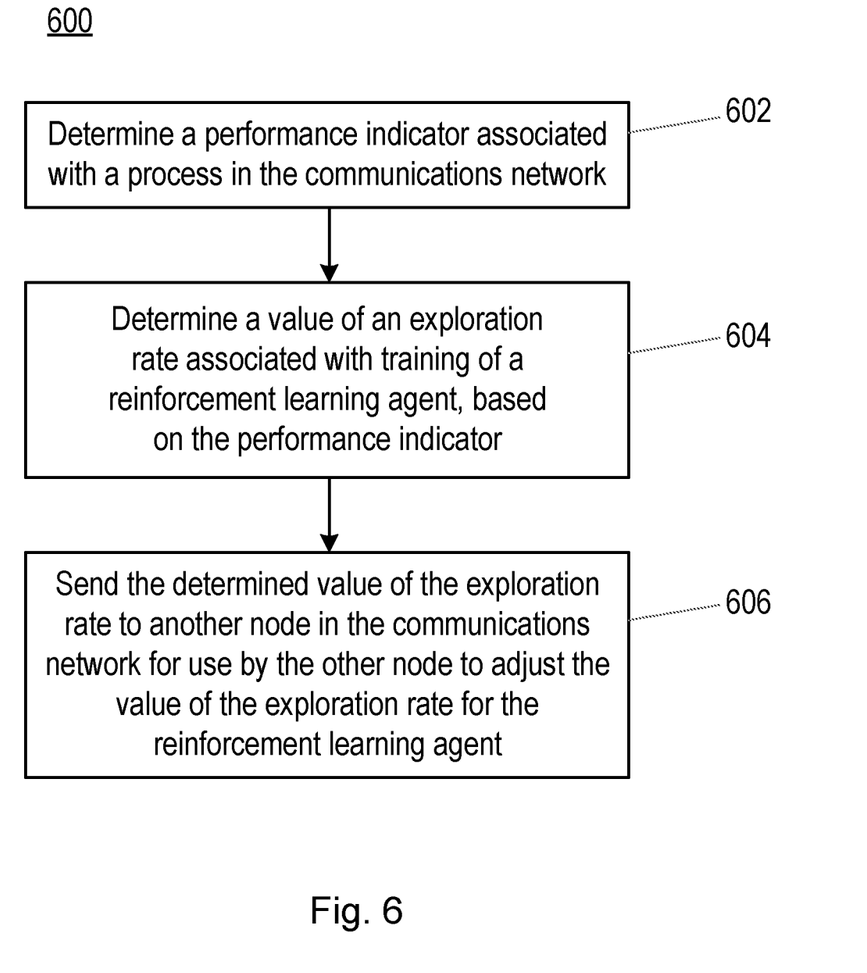
FIG. 6 shows an example method according to some embodiments herein.

Turning now to FIG. 6, there is a method 600 performed by a node in a communications network. The method 600 comprises in a first block 602 obtaining a performance indicator associated with a process in the communications network. In a second block 604 the method comprises determining a value of an exploration rate associated with training of a reinforcement learning agent, based on the performance indicator, and in a third block 606 the method further comprises sending the determined value of the exploration rate to another node in the communications network for use by the other node to adjust the value of the exploration rate for the reinforcement learning agent.

Determining a value of an exploration rate associated with training of a reinforcement learning agent, based on the performance indicator was discussed above with respect to how the node 100 determines how to adjust the value of the exploration rate associated with training of the reinforcement learning agent and the details therein will be understood to apply equally to the configuration of the method 600.

Figure 7:
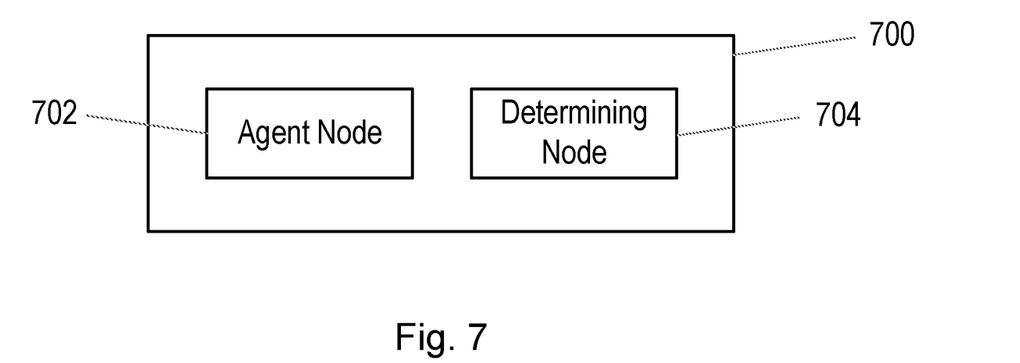
FIG. 7 shows an example system according to some embodiments herein.

Turning now to another embodiment, in FIG. 7 there is a system 700 in a communications network. The system 700 is configured to use a reinforcement learning agent to manage a process associated with the communications network, and adjust a value of an exploration rate associated with training of the reinforcement learning agent, based on a performance indicator associated with the managed process.

Using a reinforcement learning agent to manage a process associated with the communications network and adjusting a value of an exploration rate associated with training of the reinforcement learning agent were discussed at length above with respect to the nodes 100 and 500 and the examples in FIGS. 2 and 3 and the details therein will be understood to apply equally to the system 700.

In some embodiments the system may comprise an agent node 702 configured to use the reinforcement learning agent to manage a process associated with the communications network. The system 700 may further comprise a determining node 704 configured to determine a value of the exploration rate for the reinforcement learning agent, based on the performance indicator.

According to a further embodiment, there is also a computer program product comprising a computer readable medium, the computer readable medium having computer readable code embodied therein, the computer readable code being configured such that, on execution by a suitable computer or processor, the computer or processor is caused to perform any of the embodiments of the methods 400 or 600.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A node in a communications network, wherein the node is configured to:
   use a reinforcement learning agent to manage a process associated with the communications network; and
   adjust a value of an exploration rate associated with training of the reinforcement learning agent, based on a performance indicator associated with the managed process,
   wherein adjusting the value of the exploration rate comprises increasing the value of the exploration rate when:
   a performance as indicated by the performance indicator increases above a first threshold, and
   the performance as indicated by the performance indicator decreases below a second threshold, the second threshold being lower than the first threshold.

2. A method performed by a node in a communications network, the method comprising:
   using a reinforcement learning agent to manage a process associated with the communications network, wherein the process that is managed by the reinforcement learning agent comprises data transmission of a data stream to a user device; and
   adjusting a value of an exploration rate associated with training of the reinforcement learning agent, based on a performance indicator associated with the managed process, wherein the performance indicator comprises a volume of buffered data on the user device.

3. The method as in claim 2 wherein adjusting the value of the exploration rate comprises at least one of:
   adjusting the value of the exploration rate so as to maintain a performance of the managed process above a predetermined level; and
   increasing the value of the exploration rate with increasing performance of the managed process.

4. The method as in claim 2 wherein adjusting the value of the exploration rate comprises increasing the value of the exploration rate with decreasing performance of the managed process.

5. The method as in claim 2 wherein adjusting the value of the exploration rate comprises increasing the value of the exploration rate when a performance as indicated by the performance indicator increases above a first threshold.

6. The method as in claim 5 wherein adjusting the value of the exploration rate comprises decreasing the value of the exploration rate when the performance as indicated by the performance indicator is between the first and second thresholds.

7. The method as in claim 5 wherein adjusting the value of an exploration rate comprises adjusting the value of the exploration rate such that the reinforcement learning agent undertakes a more aggressive exploration strategy when the performance as indicated by the performance indicator increases above the first threshold.

8. The method as in claim 5 wherein adjusting the value of the exploration rate comprises adjusting the value of the exploration rate such that the reinforcement learning agent undertakes a more aggressive exploration strategy when the performance as indicated by the performance indicator decreases below the second threshold.

9. The method as in claim 5 wherein adjusting the value of the exploration rate comprises adjusting the value of the exploration rate such that the reinforcement learning agent takes a more conservative exploration strategy when the performance as indicated by the performance indicator is between the first and second thresholds.

10. The method as in claim 2 wherein the exploration rate associated with training of the reinforcement learning agent is adjusted based on the volume of buffered data.

11. The method as in claim 10 wherein the exploration rate is increased whilst the volume of buffered data is sufficient to enable the data to be consumed by the user on the user device in a continuous manner.

12. The method as in claim 2, further comprising obtaining the performance indicator and/or a value for the exploration rate from a network orchestrator in the communications network.

13. The method as in claim 2 wherein the performance indicator comprises one of:
    a session-level status measure;
    an application-level status measure;
    a network status measure; or
    a quality of experience measure.

14. The method as in claim 2 wherein the managed process comprises a beamforming process, or a traffic steering process.

15. A computer program product comprising a non-transitory computer readable medium, the computer readable medium having computer readable code embodied therein, the computer readable code being configured such that, on execution by a suitable computer or processor, the computer or processor is caused to perform the method as claimed in claim 2.

16. A method performed by a node in a communications network, the method comprising:
    using a reinforcement learning agent to manage a process associated with the communications network; and
    adjusting a value of an exploration rate associated with training of the reinforcement learning agent, based on a performance indicator associated with the managed process
    wherein adjusting the value of the exploration rate comprises adjusting the value of the exploration rate such that the reinforcement learning agent undertakes an exploration strategy when the performance indicator indicates that the process managed by the reinforcement learning agent is fault tolerant.

* * * * *